US012045960B2

(12) United States Patent
Sunwoo et al.

(10) Patent No.: US 12,045,960 B2
(45) Date of Patent: Jul. 23, 2024

(54) APPARATUS AND METHOD FOR PROCESSING IMAGE

(71) Applicant: AJOU UNIVERSITY INDUSTRY-ACADEMIC COOPERATION FOUNDATION, Suwon-si (KR)

(72) Inventors: Myung Hoon Sunwoo, Seoul (KR); Min Cheol Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 347 days.

(21) Appl. No.: 17/694,988

(22) Filed: Mar. 15, 2022

(65) Prior Publication Data
US 2022/0292647 A1   Sep. 15, 2022

(30) Foreign Application Priority Data

Mar. 15, 2021   (KR) .......................... 10-2021-0033484

(51) Int. Cl.
*G06T 5/70*  (2024.01)
*G06N 3/04*  (2023.01)
(Continued)

(52) U.S. Cl.
CPC ................. *G06T 5/70* (2024.01); *G06N 3/04* (2013.01); *G06T 5/10* (2013.01); *G06T 5/50* (2013.01);
(Continued)

(58) Field of Classification Search
CPC .......... G06N 3/04; G06N 3/0464; G06T 5/10; G06T 5/50; G06T 5/60; G06T 5/70;
(Continued)

(56) References Cited

U.S. PATENT DOCUMENTS 11,151,695 B1 *  10/2021  Mihal ..................... G06N 3/084
2002/0186309 A1 *  12/2002  Keshet .................. G06T 3/4015
348/272

(Continued)

OTHER PUBLICATIONS

Guo et al. "Deep wavelet prediction for image super-resolution." Proceedings of the IEEE conference on computer vision and pattern recognition workshops. 2017. (Year: 2017).*

(Continued)

*Primary Examiner* — Katrina R Fujita
(74) *Attorney, Agent, or Firm* — Sughrue Mion, PLLC

(57) ABSTRACT

There are disclosed an apparatus and method for processing images. The apparatus for processing images according to an embodiment includes an image input unit configured to receive a first image of a Bayer pattern including noise and an image output unit configured to output a noise-removed image by removing noise from the first image using a noise removal model, and the noise removal model includes a color correlation block configured to generate a second image of the Bayer pattern including RGB correlation information about the first image from the first image by performing rearrange and convolution operations on the first image, a discrete cosine transform (DCT) block configured to generate a third image in which a high-frequency component of the first image is highlighted by applying a DCT to the first image, and one or more discrete wavelet transform (DWT) blocks configured to generate a low-frequency feature map and one or more high-frequency feature maps by applying a DWT to a first feature map generated based on the first image, the second image, and the third image, and generate a final feature map in which a high-frequency component and a low-frequency component of the first feature map are highlighted based on the low-frequency feature map and the one or more high-frequency feature maps.

18 Claims, 8 Drawing Sheets

(51) Int. Cl.
*G06T 5/10* (2006.01)
*G06T 5/50* (2006.01)

(52) U.S. Cl.
CPC .............. *G06T 2207/10024* (2013.01); *G06T 2207/20052* (2013.01); *G06T 2207/20212* (2013.01)

(58) Field of Classification Search
CPC . G06T 2207/10024; G06T 2207/20052; G06T 2207/20064; G06T 2207/20084; G06T 2207/20212
See application file for complete search history.

(56) References Cited

U.S. PATENT DOCUMENTS

| | | | | |
|---|---|---|---|---|
| 2005/0244052 | A1* | 11/2005 | Keshet | G06T 5/20 348/222.1 |
| 2007/0109430 | A1* | 5/2007 | Staelin | H04N 9/646 358/518 |
| 2016/0253787 | A1* | 9/2016 | Chen | G06T 5/70 382/275 |
| 2022/0005159 | A1* | 1/2022 | Guan | G06T 5/60 |

OTHER PUBLICATIONS

Henz et al. "Deep joint design of color filter arrays and demosaicing." Computer Graphics Forum. vol. 37. No. 2. 2018. (Year: 2018).*

Liu et al. "Multi-level wavelet convolutional neural networks." IEEE Access 7 (2019): 74973-74985. (Year: 2019).*

Liu et al. "Joint demosaicing and denoising with self guidance." Proceedings of the IEEE/CVF Conference on Computer Vision and Pattern Recognition. 2020. (Year: 2020).*

Mo et al. "Frequency attention network: Blind noise removal for real images." Proceedings of the Asian Conference on Computer Vision. 2020. (Year: 2020).*

Zhao et al. "Enhancement of a cnn-based denoiser based on spatial and spectral analysis." 2019 IEEE International Conference on Image Processing (ICIP). IEEE, 2019. (Year: 2019).*

Cui et al. "Color image restoration exploiting inter-channel correlation with a 3-stage CNN." IEEE Journal of Selected Topics in Signal Processing 15.2 (2020): 174-189. (Year: 2020).*

* cited by examiner

FIG. 7

| Dataset | | MIT_more | | | Kodak |
|---|---|---|---|---|---|
| Gaussian noise (_) | 0 | 5 | 10 | 15 | 0 |
| Technologies in related art | PSNR | 33.92 | 31.99 | 30.04 | 28.62 | 41.12 |
| | SSIM | 0.9343 | 0.9115 | 0.8778 | 0.8424 | 0.9875 |
| proposed | PSNR | 34.19 | 32.28 | 30.35 | 28.96 | 41.68 |
| | SSIM | 0.9359 | 0.9147 | 0.8835 | 0.8518 | 0.9891 |

APPARATUS AND METHOD FOR PROCESSING IMAGE

TECHNICAL FIELD

Embodiments disclosed herein relate to a technology for processing images.

BACKGROUND ART OF THE INVENTION

Demosaicing refers to a technology for interpolating RGB values of all lost pixels through color values of adjacent pixels. Denoising refers to a technology for removing noise generated in an image. However, demosaicing reconstructs an image using insufficient data, and thus when a part with large deviations between pixel values, such as an edge, is demosaiced, artifacts such as zippers or aliasing are generated, and even in the case of denoising, correct information is removed as noise, which leads to a problem of occurrence of a blur.

In order to solve the above-mentioned problem, some attempts are being made to use a convolutional neural network in a method for image reconstruction. A method for performing demosaicing and denosing by using a convolutional neural network has an advantage in that it may have a stronger noise-resistance characteristic. Another advantage is that all processes can be performed from end to end by placing demosaicing and denoising technologies in one network. As typical examples of the method, there are a method in which each of pixel values of a Bayer pattern is separately extracted for skip connection structure and high speed and four GRGB channels with reduced size and a channel with a noise level are used as inputs, and a method in which an image with a density component of the image is used together as an input.

However, among the methods exemplified above, the former insufficiently removes noise and artifacts, and the latter has to obtain an image with a density component of the image through preprocessing, and as a consequence, there is a limitation that the end-to-end method may not be used.

CITATION LIST

Patent Literature (Patent Literature 1) Korean Patent Registration No. 10-1641543 (registered on Jul. 15, 2016)

DISCLOSURE OF THE INVENTION

Problem to be Solved

The disclosed embodiments are intended to provide an apparatus and method for processing images.

Means for Solving the Problem

A method for processing images according to an embodiment includes: receiving a first image of a Bayer pattern including noise; and outputting a noise-removed image by removing noise from the first image using a noise removal model, and the noise removal model includes a color correlation block configured to generate a second image of the Bayer pattern including RGB correlation information about the first image from the first image by performing rearrange and convolution operations on the first image, a discrete cosine transform (DCT) block configured to generate a third image in which a high-frequency component of the first image is highlighted by applying a DCT to the first image, and one or more discrete wavelet transform (DWT) blocks configured to generate a low-frequency feature map and one or more high-frequency feature maps by applying a DWT to a first feature map generated based on the first image, the second image, and the third image, and generate a final feature map in which a high-frequency component and a low-frequency component of the first feature map are highlighted based on the low-frequency feature map and the one or more high-frequency feature maps.

The color correlation block may generate an RGB feature map for each of an R component, a G component, and a B component of the first image by rearranging the Bayer pattern of the first image and generates the second image based on the RGB feature map.

The color correlation block may generate the second image including the RGB correlation information about the first image by performing the convolution operation on the RGB feature map.

The color correlation block may generate the second image by adding the first image and the RGB feature map in a skip connection method.

The first feature map may be generated by combining the first image, the second image, and the third image and then performing the convolution operation.

The DWT block may include a first inner residual dense block configured to generate a second feature map in which the low-frequency component of the first feature map is highlighted based on the low-frequency feature map and a second inner residual dense block configure to generate a third feature map in which the high-frequency component of the first feature map is highlighted based on the one or more high-frequency feature maps.

The second inner residual dense block may generate the third feature map based on a feature map generated by performing the convolution operation on the one or more high-frequency feature maps.

The DWT block may generate the final feature map based on a fourth feature map generated by performing the convolution operation on the second feature map, the third feature map, the low-frequency feature map, and the one or more high-frequency feature maps.

The noise removal model may further include one or more outer residual dense blocks, and the one or more DWT blocks and the one or more outer residual dense blocks may be configured in a U-net structure.

An apparatus for processing images according to an embodiment includes: an image input unit configured to receive a first image of a Bayer pattern including noise; and an image output unit configured to output a noise-removed image by removing noise from the first image using a noise removal model, and the noise removal model includes a color correlation block configured to generate a second image of the Bayer pattern including RGB correlation information about the first image from the first image by performing rearrange and convolution operations on the first image, a discrete cosine transform (DCT) block configured to generate a third image in which a high-frequency component of the first image is highlighted by applying a DCT to the first image, and one or more discrete wavelet transform (DWT) blocks configured to generate a low-frequency feature map and one or more high-frequency feature maps by applying a DWT to a first feature map generated based on the first image, the second image, and the third image, and generate a final feature map in which a high-frequency component and a low-frequency component of the first feature map are highlighted based on the low-frequency feature map and the one or more high-frequency feature maps.

The color correlation block may generate an RGB feature map for each of an R component, a G component, and a B component of the first image by rearranging the Bayer pattern of the first image and generates the second image based on the RGB feature map.

The color correlation block may generate the second image including the RGB correlation information about the first image by performing the convolution operation on the RGB feature map.

The color correlation block may generate the second image by adding the first image and the RGB feature map in a skip connection method.

The first feature map may be generated by combining the first image, the second image, and the third image and then performing the convolution operation.

The DWT block may include a first inner residual dense block configured to generate a second feature map in which the low-frequency component of the first feature map is highlighted based on the low-frequency feature map and a second inner residual dense block configure to generate a third feature map in which the high-frequency component of the first feature map is highlighted based on the one or more high-frequency feature maps.

The second inner residual dense block may generate the third feature map based on a feature map generated by performing the convolution operation on the one or more high-frequency feature maps.

The DWT block may generate the final feature map based on a fourth feature map generated by performing the convolution operation on the second feature map, the third feature map, the low-frequency feature map, and the one or more high-frequency feature maps.

The noise removal model may further include one or more outer residual dense blocks, and the one or more DWT blocks and the one or more outer residual dense blocks may be configured in a U-net structure.

Effects of Invention

According to the embodiments disclosed herein, it is possible to preserve a high-frequency component by using a frequency domain image for convolutional neural network training, and to improve the quality of the image to be reconstructed by effectively reducing color artifacts and aliasing.

BRIEF DESCRIPTION OF THE DRAWINGS

FIG. 7 is a diagram quantitatively expressing image quality loss of an image obtained through the apparatus for processing images according to an embodiment.

DETAILED DESCRIPTION OF THE INVENTION

Hereinafter, specific embodiments of an embodiment will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments, and should not be construed as limitative. Unless expressly used otherwise, a singular form includes a plural form. In the present description, the terms "including", "comprising", "having", and the like are used to indicate certain component, numbers, steps, operations, elements, and a portion or combination thereof, but should not be interpreted to preclude one or more other components, numbers, steps, operations, elements, and a portion or combination thereof.

Figure 1:
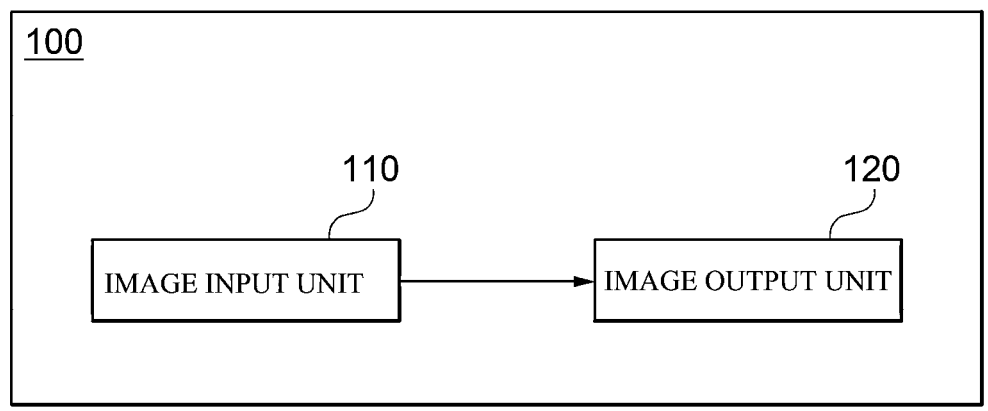
FIG. 1 is a block diagram illustrating an apparatus for processing images according to an embodiment.

FIG. 1 is a block diagram illustrating an apparatus 100 for processing images (image processing apparatus) according to an embodiment.

Referring to FIG. 1, the image processing apparatus 100 according to an embodiment includes an image input unit 110 and an image output unit 120.

In the following embodiment, each component may have different functions and capabilities in addition to those described below, and additional components may be included in addition to those not described below.

In addition, in the following embodiment, the image input unit 110 and the image output unit 120 may be implemented by using one or more physically separated devices, or may be implemented by one or more processors or a combination of one or more processors and software, and may not be clearly distinguished in specific operations, unlike the illustrated example.

The image input unit 110 receives a first image of a Bayer pattern including noise.

According to an embodiment, the first image may be, for example, an image generated by converting an original image that does not include noise into an image of a Bayer pattern and then adding noise to the converted image.

In this case, the added noise may be, for example, randomly generated Gaussian noise. However, the added noise may be generated in various ways, such as image inversion and image rotation, in addition to Gaussian noise.

Meanwhile, according to another embodiment, the first image may be an image generated by converting an original image including any noise into an image of a Bayer pattern.

The image output unit 120 outputs a noise-removed image by removing noise from the first image using a noise removal model. In this case, according to the embodiment, the noise removal model may be, for example, a model including an artificial neural network structure such as a convolutional neural network (CNN).

Figure 2:
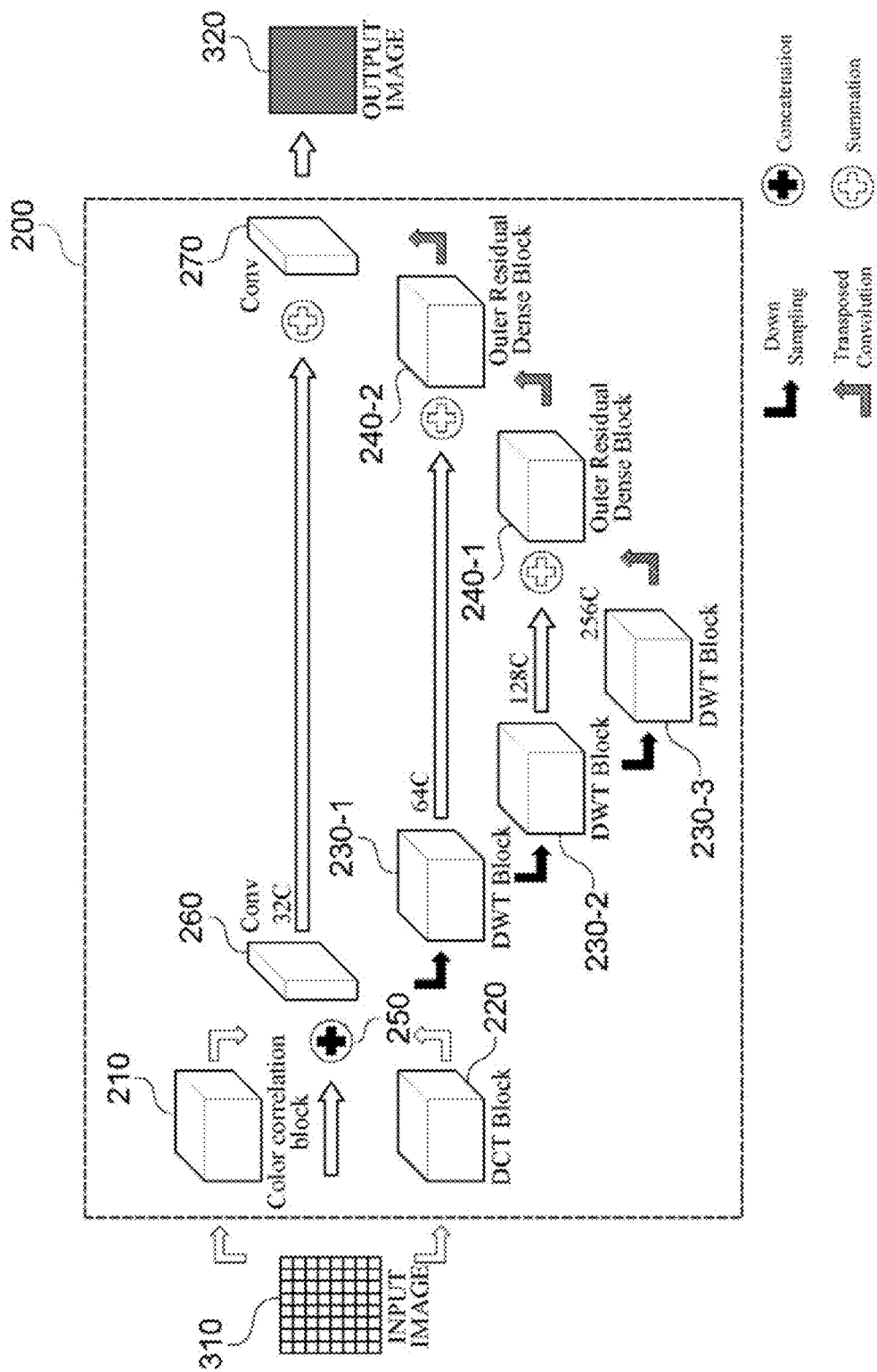
FIG. 2 is a diagram describing an overall structure of a noise removal model according to an embodiment.

FIG. 2 is a diagram describing an overall structure of a noise removal model 200.

Referring to FIG. 2, the noise removal model 200 generates a second image of the Bayer pattern including RGB correlation information about the first image 310 from the first image 310 through a color correlation block 210.

Further, the noise removal model 200 generates a third image in which a high-frequency component of the first image is highlighted from the first image 310 through a discrete cosine transform (DCT) block 220.

Then, the noise removal model 200 performs a convolution operation 260 on an image generated by concatenating (250) the first image 310, the second image, and the third image to generate a feature map.

Then, the noise removal model 200 generates a low-frequency feature map and one or more high-frequency feature maps by applying a discrete wavelet transform (DWT) to the first feature map through one or more DWT blocks 230-1, 230-2, and 230-3, and generates a final feature map based on the low-frequency feature map and the one or more high-frequency feature maps.

In addition, the noise removal model 200 may further include one or more outer residual dense blocks 240-1, 240-2, and 240-3 as shown in FIG. 2, and the one or more DWT blocks 230-1, 230-2, and 230-3 and the one or more outer residual dense blocks 240-1, 240-2, and 240-3 may be configured as an artificial neural network having a U-net structure.

Specifically, due to the U-net structure, the noise removal model 200 may perform the convolution operation 270 on the feature map obtained by repeating down sampling, summation, transposed convolution, and concatenation processes on the first feature map, and the image output unit 120 may output an output image in which noise has been removed based on the feature map obtained by repeating the above processes.

Meanwhile, each of the DWT blocks 230-1, 230-2, and 230-3 may generate a feature map in which the width and height are halved and the number of channels is doubled as compared with the received feature map.

For example, when the size of the first feature map is 128*128*32, the size of the feature map generated in the first DWT block 230-1 may be 64*64*64. Accordingly, when the size of the feature map generated in the first DWT block 230-1 is 64*64*64, the size of the feature map generated in the second DWT block 230-2 is 32*32*128. When the size of the feature map generated in the second DWT block 230-2 is 32*32*128, the size of the feature map generated in the third DWT block 230-3 may be 16*16*256.

That is, the noise removal model 200 may change a receptive field of the model by reducing the size of the feature map input to each of the DWT blocks 230-1, 230-2, and 230-3. As a result, the noise removal model 200 may learn global features of the original image as well as local features thereof.

Similarly, as inputs, the first outer residual dense block 240-1 may receive 128 channels, and the second outer residual dense block 240-2 may receive 64 channels.

However, the size of the feature map and the number of channels are not limited to those of the above-described example, and the U-Net structure shown in FIG. 2 is merely exemplary, and thus the DWT block 230 that may be included in the noise removal model 200 and the number of outer residual dense blocks 240 are not limited to those shown.

Figure 3:
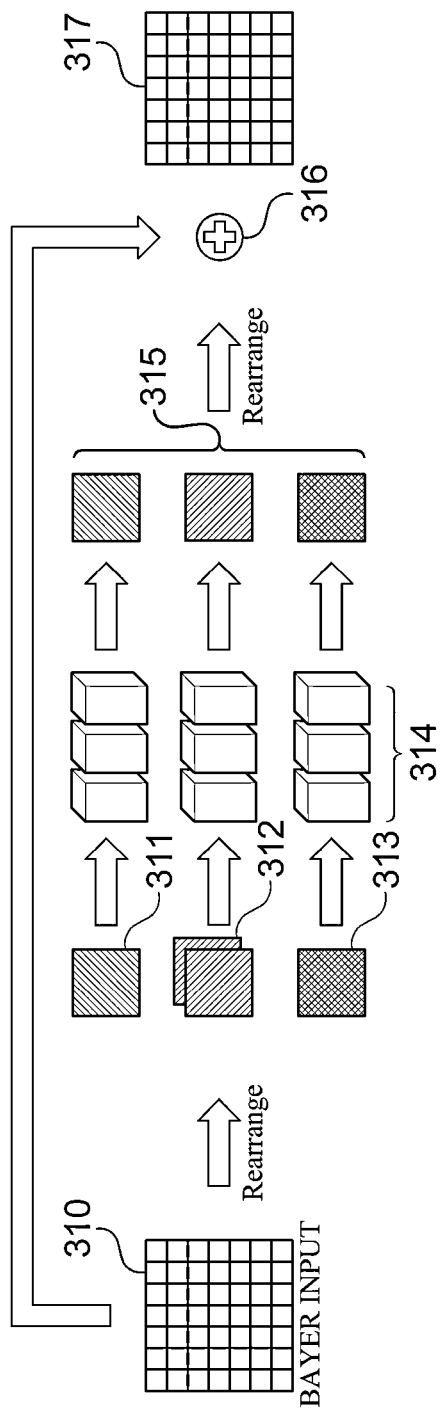
FIG. 3 is a diagram describing a color correlation block according to an embodiment.

FIG. 3 is a diagram describing the color correlation block 210 according to an embodiment.

Referring to FIG. 3, the color correlation block 210 may generate a second image 317 of the Bayer pattern including RGB correlation information about the first image 310 from the first image 310 by performing rearrange and convolution operations on the first image 310.

The image of the Bayer pattern has only information on one color per pixel. Accordingly, there is a limitation in that color information about a pixel adjacent to a specific pixel by one pixel unit may not be found. However, considering the Bayer pattern, color information (RGB correlation information) about a pixel adjacent to a specific pixel by two pixel units may be found. Accordingly, the color correlation block 210 may generate the second image 317 of the Bayer pattern more suitable for demosaicing and denoising than the first image 310 by rearranging the first image 310 into channels for each color, and then extracting RGB correlation information.

Specifically, the color correlation block 210 may generate one red (R) channel 311 and two green (G) channels 312 and one blue (B) channel 313 by receiving the first image 310 and rearranging the first image 310.

Then, the color correlation block 210 may generate the second image 317 including RGB correlation information by performing the convolution operation on each of one red (R) channel 311, two green (G) channels 312, and one blue (B) channel 313 to extract a feature map 315 for each channel including RGB correlation information, and then rearranging the feature map 315 for each channel into a Bayer pattern again.

In addition, the feature map 315 for each channel may be a term which RGB feature maps 311, 312, and 313 are collectively referred to as for convenience of description, that is, the color correlation block 210 may generate the second image 317 of the Bayer pattern including the RGB correlation information about the first image 310 by performing the convolution operation 314 on the RGB feature maps 311, 312, and 313.

In addition, here, the color correlation block 210 may generate the second image 317 by adding the first image 310 and the RGB feature maps 311, 312, and 313 in a skip connection method 316.

After all, the image processing apparatus 100 includes the color correlation block 210 as one block in the noise removal model 200, which may replace the operations of preprocessing a plurality of data to be used for learning (e.g., the first image 310) and then inputting the preprocessed data into the learning model as in the related art.

That is, according to an embodiment, the image processing apparatus 100 includes the color correlation block 210 in the noise removal model 200, which may help to provide an end-to-end single network construction.

Figure 4:
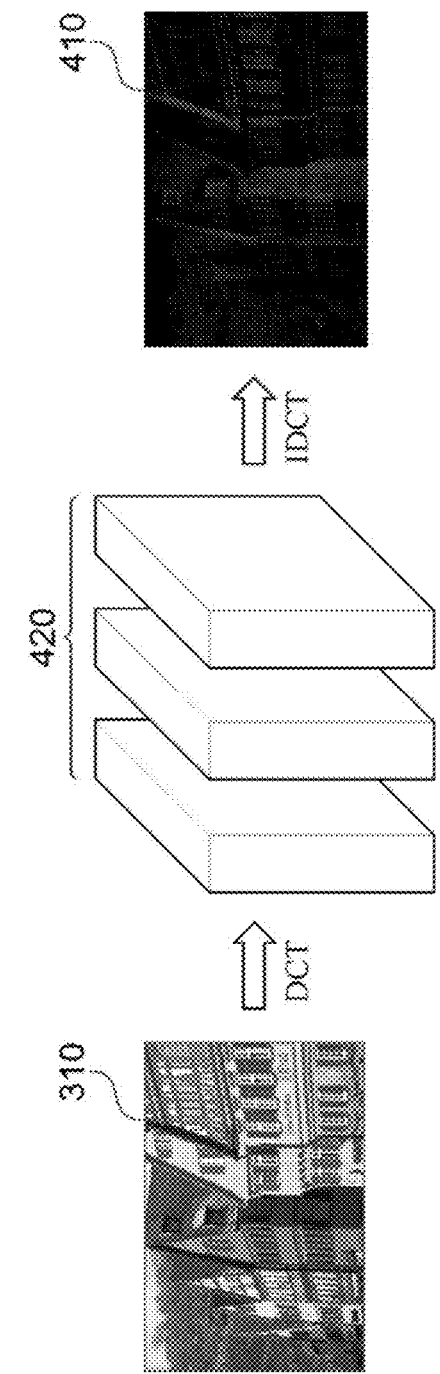
FIG. 4 is a diagram describing a discrete cosine transform (DCT) block according to an embodiment.

FIG. 4 is a diagram describing the DCT block 220 according to an embodiment.

Referring to FIG. 4, the DCT block 220 may generate a third image 410 in which a high-frequency component of the first image 310 is highlighted by applying a DCT to the first image 310.

The DCT refers to a method of converting an image expression method from a spatial domain to a frequency domain.

When the DCT block 220 converts the first image 310 of the spatial domain into a frequency image by applying the DCT to the first image 310, the low-frequency components corresponding to most components of the first image 310 are gathered in units of (0,0), and accordingly, the DCT block 220 may extract a high-frequency component in more detail compared to a pixel image of the original image.

After receiving the first image 310 as an input, the DCT block 220 converts the first image 310 into the frequency domain by applying the DCT to the first image 310. Then, the DCT block 220 may generate the third image 410 in which the high-frequency component is highlighted by performing a convolution operation 420 on the first image 310 converted into the frequency domain, and then applying an inverse discrete cosine transform (IDCT) to the first image 310.

Figure 5:
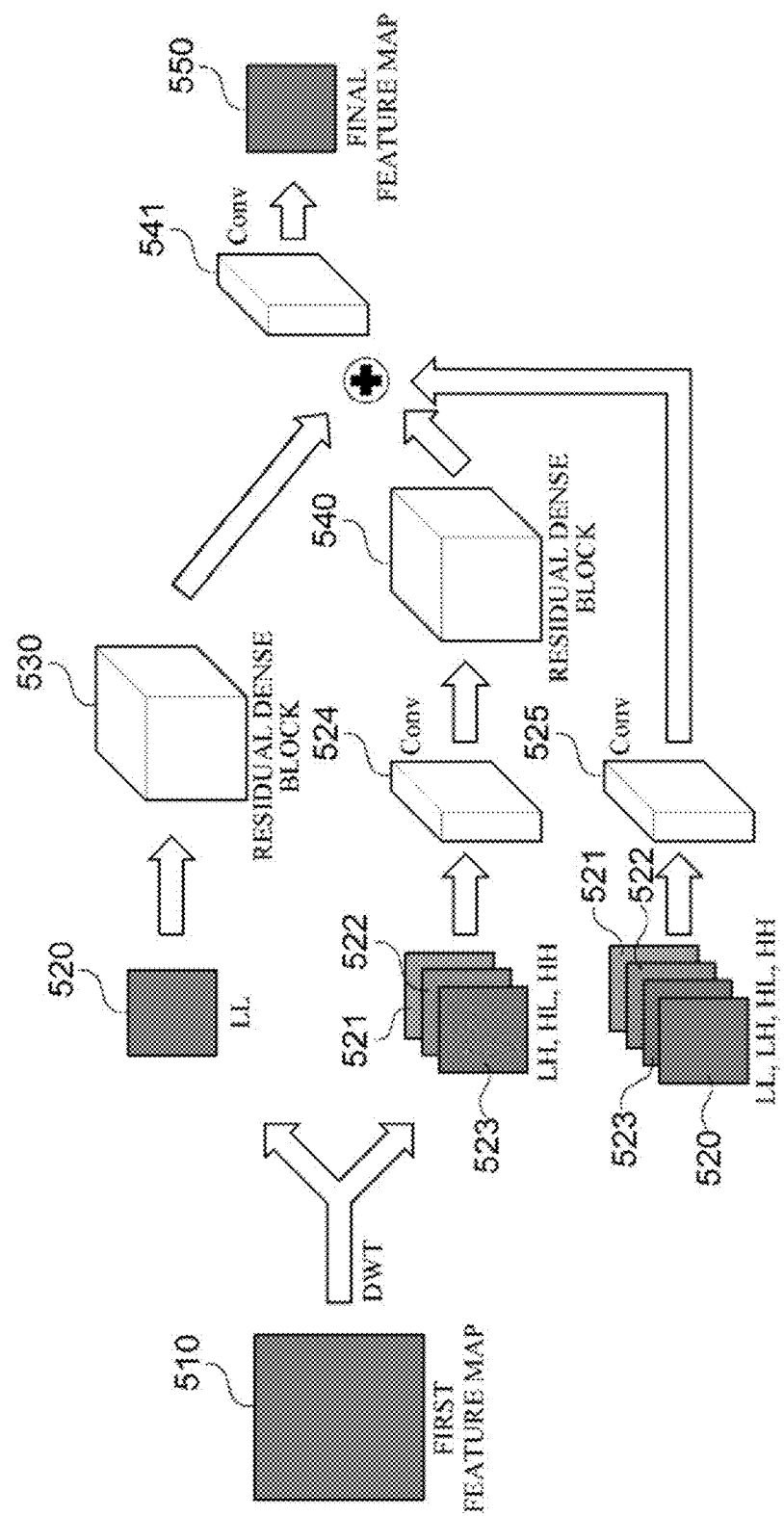
FIG. 5 is a diagram describing a discrete wavelet Transform (DWT) block according to an embodiment.

FIG. 5 is a diagram describing the DWT block 230 according to an embodiment.

Referring to FIG. 5, the DWT block 230 may generate a low-frequency feature map 520 and one or more high-frequency feature maps 521, 522, and 523 by applying the DWT to the first feature map 510 generated based on the first image 310, the second image 317, and the third image 410.

Further, the DWT block 230 may generate a final feature map 550 in which the high-frequency component and the low-frequency component of the first feature map are highlighted based on the low-frequency feature map 520 and the one or more high-frequency feature maps 521, 522, and 523.

Meanwhile, in the following, it is assumed that one or more high-frequency feature maps collectively refer to an LH feature map 521, an HL feature map 522, and an HH feature map 523, which will be described later, for convenience of description, and the low-frequency feature map 520 indicates an LL feature map 520 to be described later.

Here, DWT refers to a process of decomposing input data into hierarchical sub-bands. In this case, there are high-frequency sub-bands and low-frequency sub-bands as types of sub-bands. The high-frequency sub-bands include high-frequency sub-bands for horizontal, vertical, and diagonal positions, which may be denoted by LH, HL, and HH, respectively. Similarly, the low-frequency sub-band may be denoted by LL.

Specifically, the DWT block 230 may generate the LL feature map with a low-frequency component and the LH feature map 521 with a primary differential value in a y-axis direction by applying, to the first feature map 510, a low-pass filter in an x-axis direction, and then again, applying, to the first feature map 510, each of a low-pass filter in the y-axis direction and a high-pass filter in the y-axis direction.

Similarly, the DWT block 230 may generate the HL feature map 522 with a primary differential value in the x-axis direction and the HH feature map 523 with a primary differential value in a diagonal direction by applying, to the first feature map 510, the low-pass filter in the x-axis direction, and then again, applying, to the first feature map 510, each of the low-pass filter in the y-axis direction and the high-pass filter in the y-axis direction.

Then, the DWT block 230 may generate a second feature map (not shown) in which a low-frequency component of the first feature map 510 is highlighted from the low-frequency feature map 520 through a first inner residual dense block 530.

In addition, the DWT block 230 may generate a third feature map (not shown) in which a high-frequency component of the first feature map 510 is highlighted from the one or more high-frequency feature maps 521, 522, and 523 through a second inner residual dense block 540.

Here, a correlation between the differential value in the x-axis direction, the differential value in the y-axis direction, and the differential value in the diagonal direction helps the DWT block 230 to extract the high-frequency component of the first feature map 510 in more detail.

Therefore, the DWT block 230 may generate a third feature map (not shown) by performing a convolution operation 524 on one or more high-frequency feature maps 521, 522, and 523, and then using the second inner residual dense block 540.

Specifically, the noise removal model 300 may generate a third feature map (not shown) by concatenating one or more high-frequency feature maps 521, 522, and 523, and performing the convolution operation 524 on the concatenated one or more high-frequency feature maps 521, 522, and 523.

Further, the DWT block 230 may generate a final feature map 550 by concatenating, with the second feature map and the third feature map, a fourth feature map (not shown) generated by performing a convolution operation 525 on the low-frequency feature map 520 and the one or more high-frequency feature maps 521, 522, and 523, and then performing the convolution operation 541.

Figure 6:
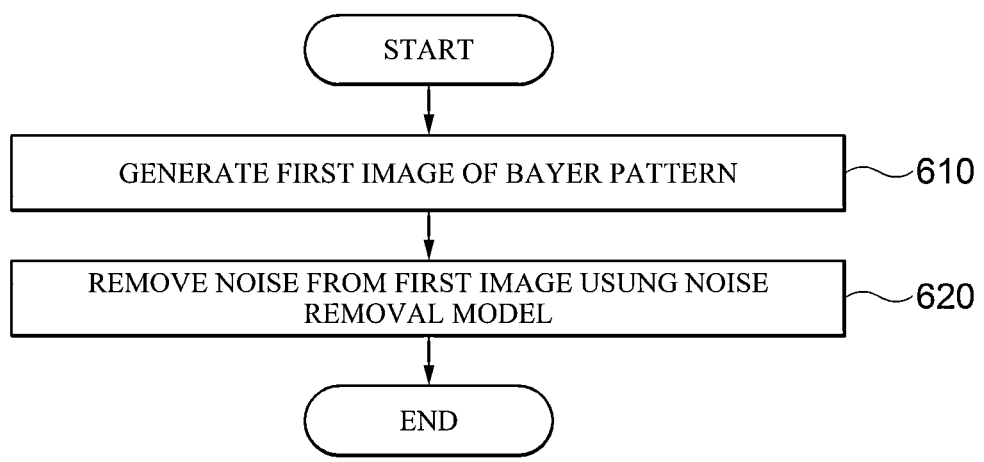
FIG. 6 is a flowchart illustrating a method for processing images according to an embodiment.

FIG. 6 is a diagram illustrating a method for processing images according to an embodiment.

The method shown in FIG. 6 may be performed by the image processing apparatus 100 shown in FIG. 1.

Referring to FIG. 6, the image processing apparatus 100 generates the first image 310 of the Bayer pattern in which noise processing is performed on the original image (610).

Then, the image processing apparatus 100 removes noise from the first image 310 using the noise removal model 200 (620).

In this case, the noise removal model 200 includes the color correlation block 210 that generates the second image 317 of the Bayer pattern including RGB correlation information about the first image 310 from the first image 310 by performing rearrange and convolution operations on the first image 310.

Further, the noise removal model 200 includes the DCT block 220 that generates the third image 410 in which a high-frequency component of the first image 310 is highlighted by applying the DCT to the first image 310.

Further, the noise removal model 200 includes one or more DWT blocks 230 that generate the low-frequency feature map 520 and the one or more high-frequency feature maps 521, 522, and 523 by applying a DWT to the first feature map 510 generated based on the first image 310, the second image 317, and the third image 410, and generate the final feature map 550 in which a high-frequency component and a low-frequency component of the first feature map are highlighted based on the low-frequency feature map 520 and the one or more high-frequency feature maps 521, 522, and 523.

In FIG. 6 shown above, the method is divided into a plurality of steps; however, at least some of the steps may be performed in a different order, performed together in combination with other steps, omitted, performed in subdivided steps, or performed by adding one or more steps not illustrated.

FIG. 7 is a diagram quantitatively evaluating an image obtained through the image processing apparatus 100 according to an embodiment.

As shown in FIG. 7, it is confirmed that the quality of the image generated in the image processing apparatus 100 according to an embodiment is improved compared to the technologies in the related art, considering a peak signal-to-noise ratio (PSNR), which evaluates image quality loss, and a structural similarity index map (SSIM), which indicates the degree of structural distortion of an image.

Figure 8:
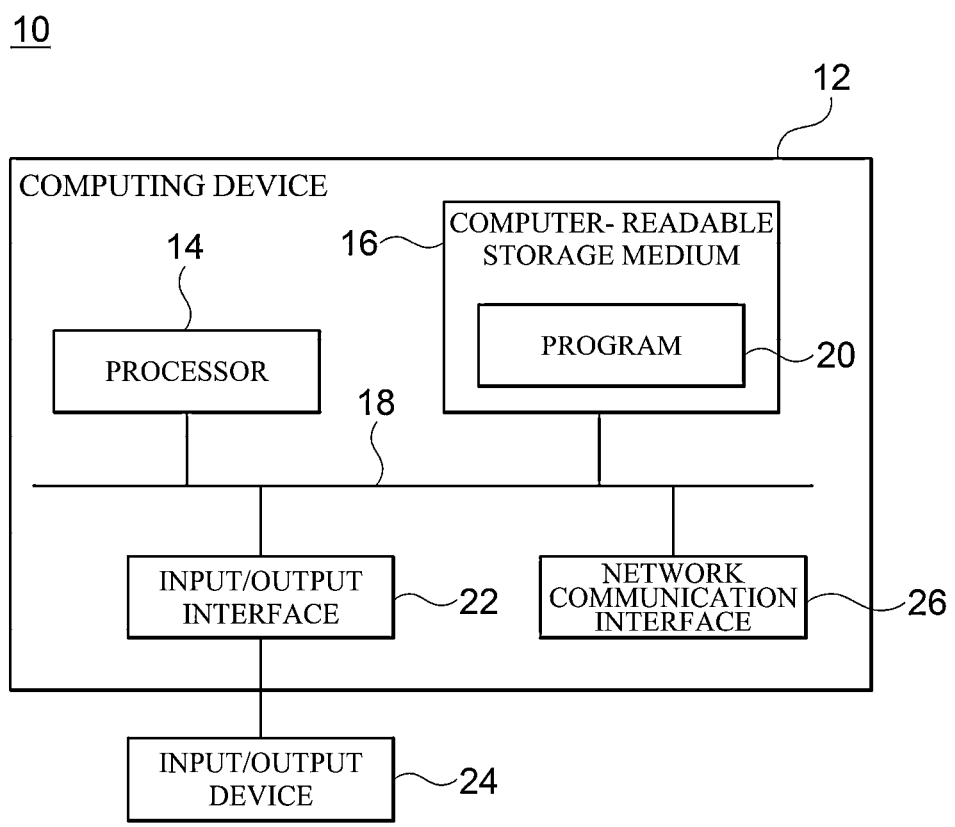
FIG. 8 is a block diagram for exemplarily illustrating a computing environment including a computing device according to an embodiment.

FIG. 8 is a block diagram for exemplarily illustrating a computing environment including a computing device according to an embodiment.

FIG. 8 is a block diagram for exemplarily illustrating a computing environment 10 including a computing device 12 according to an embodiment. In the illustrated embodiment, respective components may have different functions and capabilities in addition to those described below, and additional components may be included in addition to those not described below.

The illustrated computing environment 10 includes a computing device 12. In an embodiment, the computing device 12 may be one or more components included in the image processing a apparatus 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

Although the present disclosure has been described in detail through the representative embodiments as above, those skilled in the art will understand that various modifications can be made thereto without departing from the scope of the present disclosure. Therefore, the scope of rights of the present disclosure should not be limited to the described embodiments, but should be defined not only by the claims set forth below but also by equivalents of the claims.

The invention claimed is:

1. A method for processing images, comprising:
receiving a first image of a Bayer pattern including noise; and
outputting a noise-removed image by removing noise from the first image using a noise removal model,
wherein the noise removal model includes:
a color correlation block configured to generate a second image of the Bayer pattern including RGB correlation information about the first image from the first image by performing rearrange and convolution operations on the first image;
a discrete cosine transform (DCT) block configured to generate a third image in which a high-frequency component of the first image is highlighted by applying a DCT to the first image; and
one or more discrete wavelet transform (DWT) blocks configured to generate a low-frequency feature map and one or more high-frequency feature maps by applying a DWT to a first feature map generated based on the first image, the second image, and the third image, and generate a final feature map in which a high-frequency component and a low-frequency component of the first feature map are highlighted based on the low-frequency feature map and the one or more high-frequency feature maps.

2. The method of claim 1,
wherein the color correlation block generates an RGB feature map for each of an R component, a G component, and a B component of the first image by rearranging the Bayer pattern of the first image and generates the second image based on the RGB feature map.

3. The method of claim 2,
wherein the color correlation block generates the second image including the RGB correlation information about the first image by performing the convolution operation on the RGB feature map.

4. The method of claim 3,
wherein the color correlation block generates the second image by adding the first image and the RGB feature map in a skip connection method.

5. The method of claim 1,
wherein the first feature map is generated by combining the first image, the second image, and the third image and then performing the convolution operation.

6. The method of claim 1,
wherein the DWT block includes a first inner residual dense block configured to generate a second feature map in which the low-frequency component of the first feature map is highlighted based on the low-frequency feature map and a second inner residual dense block configure to generate a third feature map in which the high-frequency component of the first feature map is highlighted based on the one or more high-frequency feature maps.

7. The method of claim 6, wherein the second inner residual dense block generates the third feature map based on a feature map generated by performing a convolution operation on the one or more high-frequency feature maps.

8. The method of claim 6, wherein the DWT block generates the final feature map based on a fourth feature map generated by performing a convolution operation on the second feature map, the third feature map, the low-frequency feature map, and the one or more high-frequency feature maps.

9. The method of claim 1,
wherein the noise removal model further includes one or more outer residual dense blocks, and
the one or more DWT blocks and the one or more outer residual dense blocks are configured in a U-net structure.

10. An apparatus for processing images comprising:
an image input unit configured to receive a first image of a Bayer pattern including noise; and
an image output unit configured to output a noise-removed image by removing noise from the first image using a noise removal model,
wherein the noise removal model includes:
a color correlation block configured to generate a second image of the Bayer pattern including RGB correlation information about the first image from the first image by performing rearrange and convolution operations on the first image;
a discrete cosine transform (DCT) block configured to generate a third image in which a high-frequency component of the first image is highlighted by applying a DCT to the first image; and
one or more discrete wavelet transform (DWT) blocks configured to generate a low-frequency feature map and one or more high-frequency feature maps by applying a DWT to a first feature map generated based on the first image, the second image, and the third image, and generate a final feature map in which a high-frequency component and a low-frequency component of the first feature map are highlighted based on the low-frequency feature map and the one or more high-frequency feature maps.

11. The apparatus of claim 10,
wherein the color correlation block generates an RGB feature map for each of an R component, a G component, and a B component of the first image by rearranging the Bayer pattern of the first image and generates the second image based on the RGB feature map.

12. The apparatus of claim 11,
wherein the color correlation block generates the second image including the RGB correlation information about the first image by performing the convolution operation on the RGB feature map.

13. The apparatus of claim 12,
wherein the color correlation block generates the second image by adding the first image and the RGB feature map in a skip connection method.

14. The apparatus of claim 10,
wherein the first feature map is generated by combining the first image, the second image, and the third image and then performing the convolution operation.

15. The apparatus of claim 10,
wherein the DWT block includes a first inner residual dense block configured to generate a second feature map in which the low-frequency component of the first feature map is highlighted based on the low-frequency feature map and a second inner residual dense block configure to generate a third feature map in which the high-frequency component of the first feature map is highlighted based on the one or more high-frequency feature maps.

16. The apparatus of claim 15, wherein the second inner residual dense block generates the third feature map based on a feature map generated by performing a convolution operation on the one or more high-frequency feature maps.

17. The apparatus of claim 15, wherein the DWT block generates the final feature map based on a fourth feature map generated by performing a convolution operation on the second feature map, the third feature map, the low-frequency feature map, and the one or more high-frequency feature maps.

18. The apparatus of claim 10,
wherein the noise removal model further includes one or more outer residual dense blocks, and
the one or more DWT blocks and the one or more outer residual dense blocks are configured in a U-net structure.

* * * * *